US006027600A

United States Patent [19]

Sankaran et al.

[11] Patent Number: 6,027,600

[45] Date of Patent: Feb. 22, 2000

[54] DUAL SIMPLEX PRINTER MEDIA AND METHOD

[75] Inventors: Velliyur R. Sankaran; Fred A. Willis, both of Boulder; Ronald W. Wisnesky, Longmont, all of Colo.

[73] Assignee: International Business Machines Corporaiton, Armonk, N.Y.

[21] Appl. No.: 08/950,121

[22] Filed: Oct. 14, 1997

[51] Int. Cl.[7] .......... B32B 31/00

[52] U.S. Cl. .......... 156/277; 156/230; 156/238; 156/278; 156/328.4; 427/208.4; 427/208.8

[58] Field of Search .......... 156/230, 238, 156/249, 308.4, 277, 278, 289; 427/208.4, 208.8, 289; 428/40, 42, 202, 206, 520, 922

[56] References Cited

U.S. PATENT DOCUMENTS

| | | | |
|---|---|---|---|
| 4,077,830 | 3/1978 | Fulwiler | 156/249 |
| 4,111,121 | 9/1978 | Borum | 101/227 |
| 4,232,299 | 11/1980 | Trask | 355/319 |
| 4,913,926 | 4/1990 | Rutkowski | 427/14.1 |
| 4,974,035 | 11/1990 | Rabb | 355/320 |
| 5,095,369 | 3/1992 | Ortiz | 358/296 |
| 5,201,464 | 4/1993 | File | 229/305 |
| 5,258,809 | 11/1993 | Wiedemer | 355/200 |
| 5,418,026 | 5/1995 | Dronzek, Jr. | 428/40 |
| 5,430,536 | 7/1995 | Fullerton | 355/320 |
| 5,513,013 | 4/1996 | Kuo | 358/448 |
| 5,543,191 | 8/1996 | Dronzek, Jr. | 428/41.5 |
| 5,575,574 | 11/1996 | Mertens | 400/118.2 |
| 5,753,414 | 5/1998 | Rach et al. | 430/309 |
| 5,776,591 | 7/1998 | Mertens | 428/195 |

*Primary Examiner*—Merrick Dixon
*Attorney, Agent, or Firm*—Gunster, Yoakley, Valdes-Fauli & Stewart; Michael J. Buchenhorner

[57] ABSTRACT

A method for printing comprises the steps of feeding a multi-layer compound sheet into a dual-simplex printer, printing on each side of the multi-layer compound sheet, and separating the layers of the multi-layer compound sheet to produce at; least two sheets having with printed material on one side. The multi-layer sheets comprise a first layer and second layer bonded to the first layer with pressure sensitive adhesive.

13 Claims, 5 Drawing Sheets

DUAL SIMPLEX PRINTER MEDIA AND METHOD

BACKGROUND OF THE INVENTION

The present invention relates to printers and printer media and more specifically to a method for operating a printer with special printer media (paper) to enhance printer performance.

Duplex printing has become widely available and has provided the capability to produce printed pages having printing on both sides. However, two-sided printing is not required for all applications. Increasing the speed or rate of printing usually requires improvement in the equipment. Accordingly a need exists for a process for increasing printing speed without having to design new equipment.

Turning now to FIG. 1, there is shown typical high speed, high volume printer system for printing continuous forms in which the invention may be advantageously used. The printer system 100 is a continuous form printer such as the IBM 3900 family of printers. Printers in this family employ both pin feed or tractor type feeding mechanisms and also support for pin-less type feed mechanisms. The printer system 100 includes an optional preprocessing device 101 for holding a roll of continuous feed print stock. A printer 103 for printing on the print stock and a post processing unit 109 for processing printed stock. FIG. 2 illustrates a printing system 200 arranging two printers from FIG. 1. in a series configuration for duplex printing. The two printers, a first printer 203 and a second printer 206 are separated by a buffer-flipper unit 204. The buffer-flipper unit 204 takes the continuous print stock exiting from first printer 203 and turns over the print stock before threading it through second printer 206. First printer 203 prints on one side of the continuous print stock and printer 206 prints on the second side of the print stock.

Referring to FIG. 3, there is shown another duplex printer in which the invention may be advantageously used. The printer 10 is a web-fed duplex printer such as the IBM 3170. It comprises a paper supply unit comprising paper reel 11, a splicing table 12, a heated roll 13, a paper cooling unit 14, and a paper conditioning sensor 15. The following processes occur in the paper supply unit.

The operator first inserts an axle in the core of the paper roll 11 and then places the roll in the paper supply using a small hand truck. The paper supply has no paper-driving function; instead, the web is pulled from the paper supply into the print tower. A brake system keeps the paper web at a certain tension between the reel and the first web drive motor. The brake system also detects when the amount of paper remaining on the roll is low.

When a roll is finished, or when you decide to change paper before the roll is finished, you will splice the leading edge of the new roll to the trailing edge of the old roll.

Moisture influences print quality. Thus, the paper supply includes a paper-conditioning system that uses a heated roll to dry the paper to a certain moisture content. After drying, the paper temperature is reduced by the cooling unit. The entire system is controlled by a paper conditioning sensor. When printing stops, the paper is immediately pulled away from the heated roll to avoid scorching the paper.

The printer 10 also includes a print tower portion comprising a first web drive motor (speed motor) 16, print stations 17, a top roller 18, a fuser 19, a paper cooling unit 20, a second web drive motor 23, a cutter 22, and an output stacker 25.

The print tower has eight print units, four for each side of the paper. Each unit prints one of the four "process" colors, cyan, magenta, yellow, and black (CMYK). After the paper passes through the eight print units, it goes over the top roller 18, which directs the paper toward the fuser 19. The non-contact fuser 19 affixes the eight toner layers to the paper. Because the temperature of the paper is high when it leaves the fuser, it passes a paper cooling unit 20, which blows cooled air on the paper's surface. Other printers having duplex capability may also be used with the invention.

The paper web is driven by two motors (16 and 21), which are accurately controlled to maintain a constant web speed and tension. This constancy provides a stable register (the correct positioning of the four color layers on top of each other and the positioning of the image on the front of the paper as compared to the back).

Before the paper leaves the print tower, it passes the cutter 22, where it is cut perpendicular to the paper movement. The paper is then transported by a conveyer to the output stacker 23.

SUMMARY OF THE INVENTION

Briefly, in accordance with the invention, a method for printing comprises the steps of feeding a multi-layer compound sheet into a dual-simplex printer, printing on each side of the multi-layer compound sheet, and separating the layers of the multi-layer compound sheet to produce at least two sheets having with printed material on one side. The multi-layer sheets comprise a first layer and second layer bonded to the first layer with pressure sensitive adhesive.

BRIEF DESCRIPTION OF THE DRAWING(S)

DESCRIPTION OF THE ILLUSTRATIVE EMBODIMENT(S)

Figure 1:
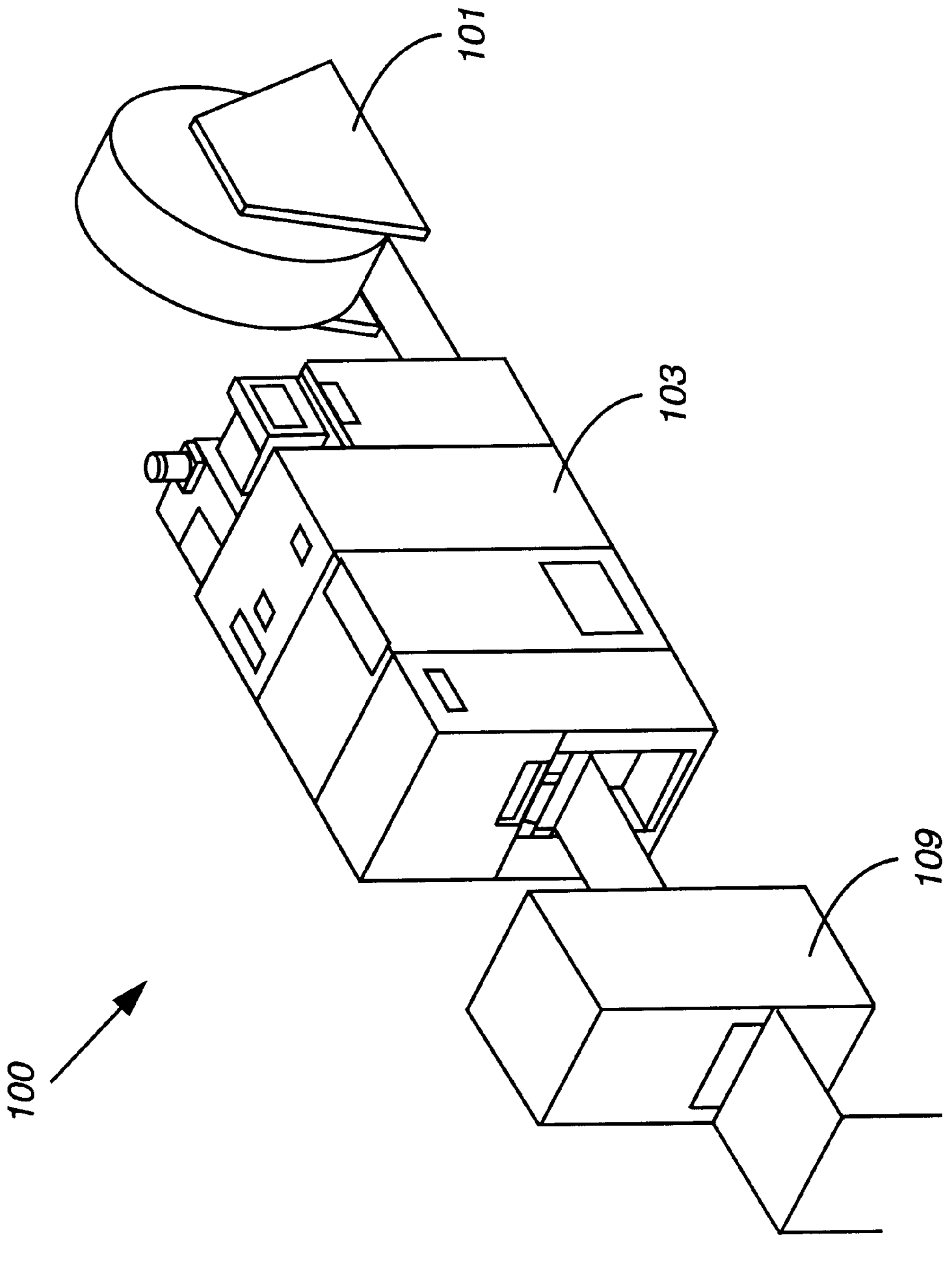
FIG. 1 illustrates a simplex printing system for high volume printing.
Figure 2:
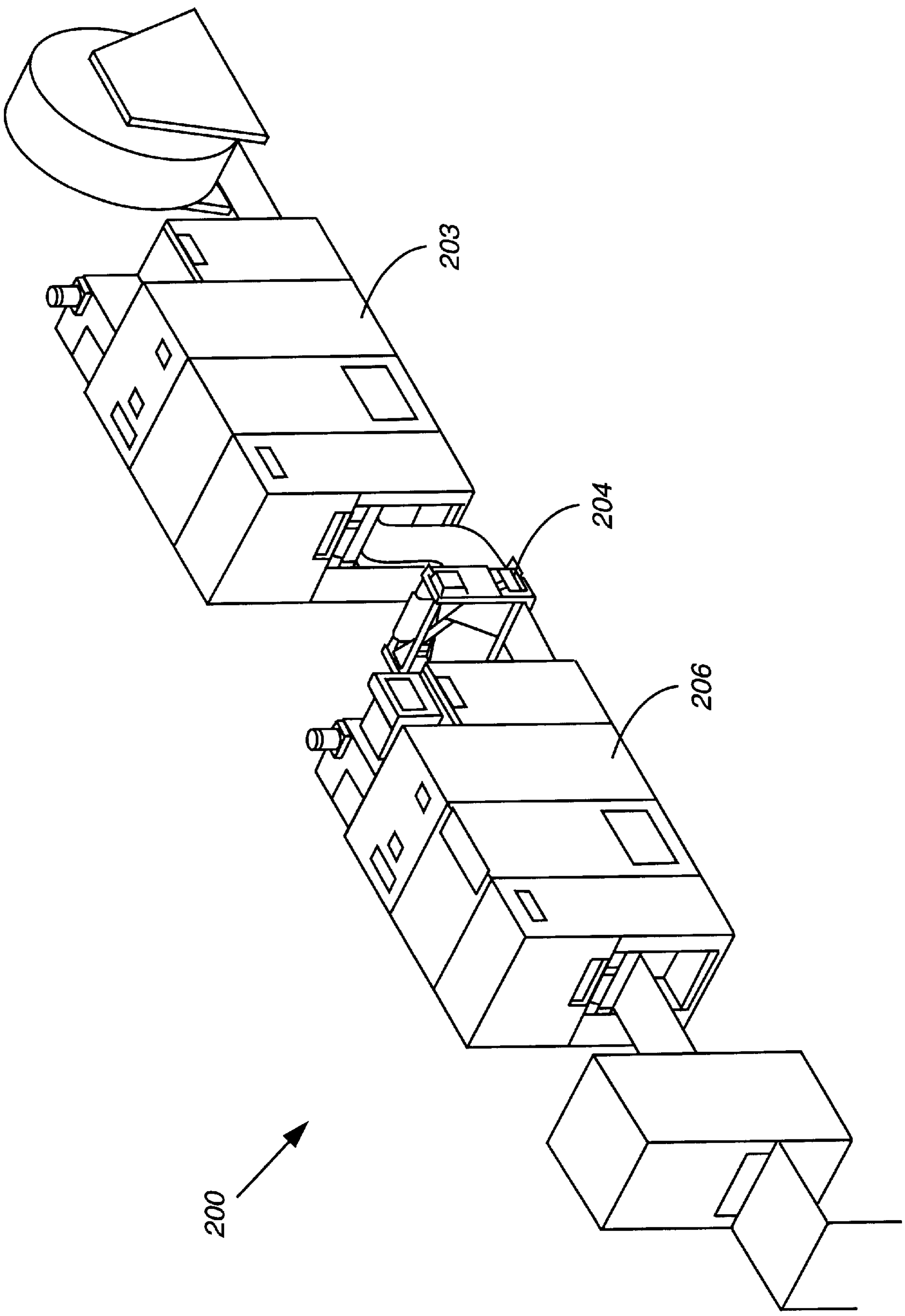
FIG. 2 illustrates a dual in-line configuration of printing system in FIG. 1. for duplex printing.
Figure 3:
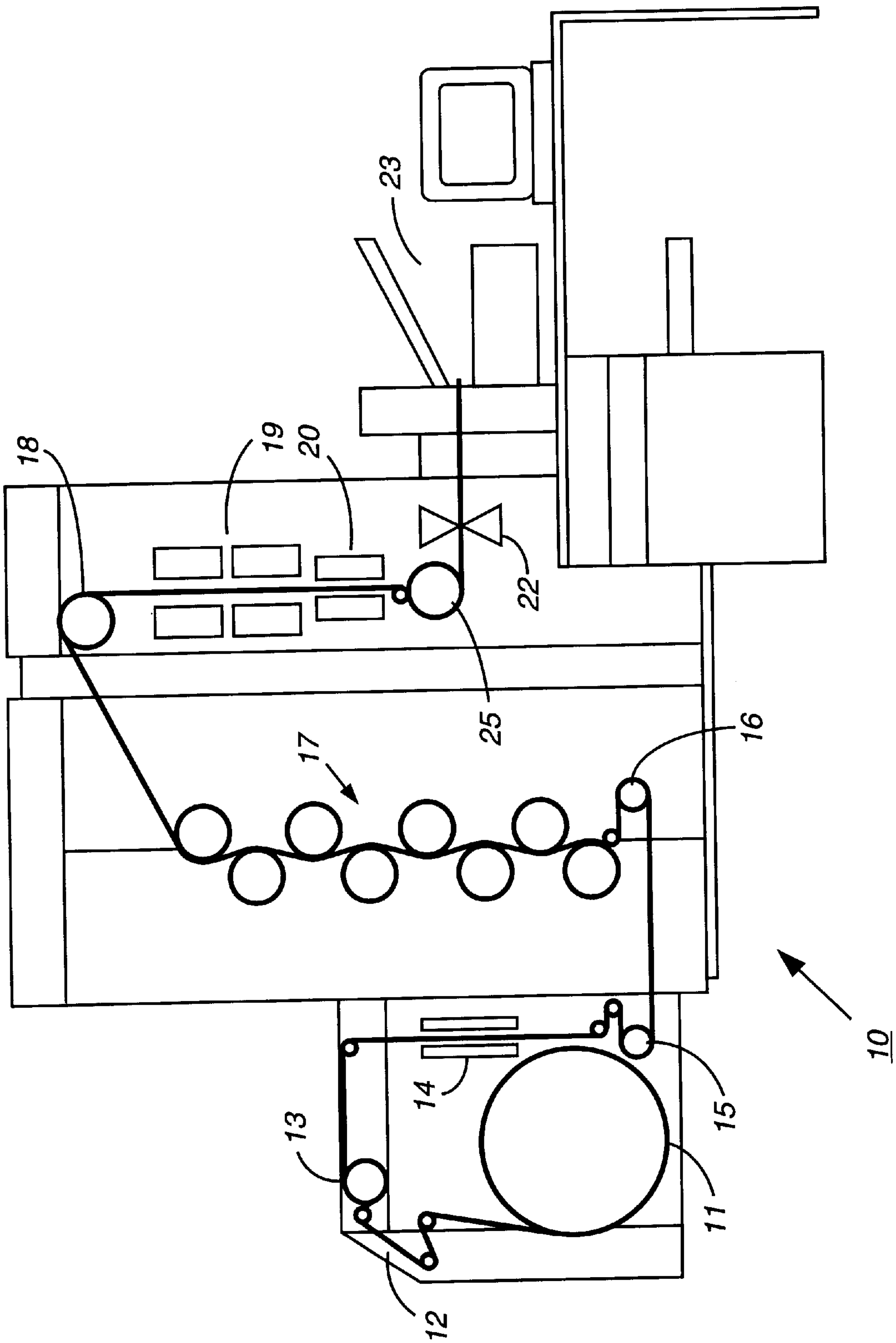
FIG. 3 shows a printer in which a process in accordance with the invention may be realized.
Figure 4:
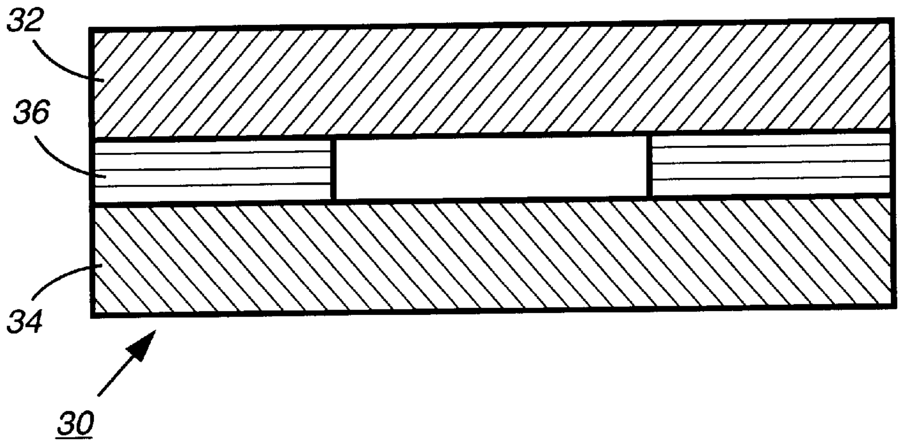
FIG. 4 is a cross-section of a print medium constructed in accordance with one embodiment of the invention.

Referring to FIG. 4, there is shown a cross-section of a compound print medium 30 constructed in accordance with one embodiment of the invention. The medium 30 is a compound (or multi-layer) sheet comprising a first layer (face stock) 32 and a second layer (bottom stock) 34 bonded to the first layer by means of a liner 36 with adhesive. The liner 36 is preferably a thin Silicone liner material bonded along the edges of either the first or second layer. A pressure-sensitive adhesive is applied on the Silicone liner material. The thickness of the liner can be varied as per the thickness of the face stock 32. The bottom face stock 34 can be similarly, bonded to the bottom side of the liner 36 with the same pressure-sensitive adhesive. The total thickness of the medium 30 should not generally exceed 10 mils (10 point). After the media are constructed printing can be performed with a printer such as the Infocolor 70 printer in the same manner as used with single layer media.

Figure 5:
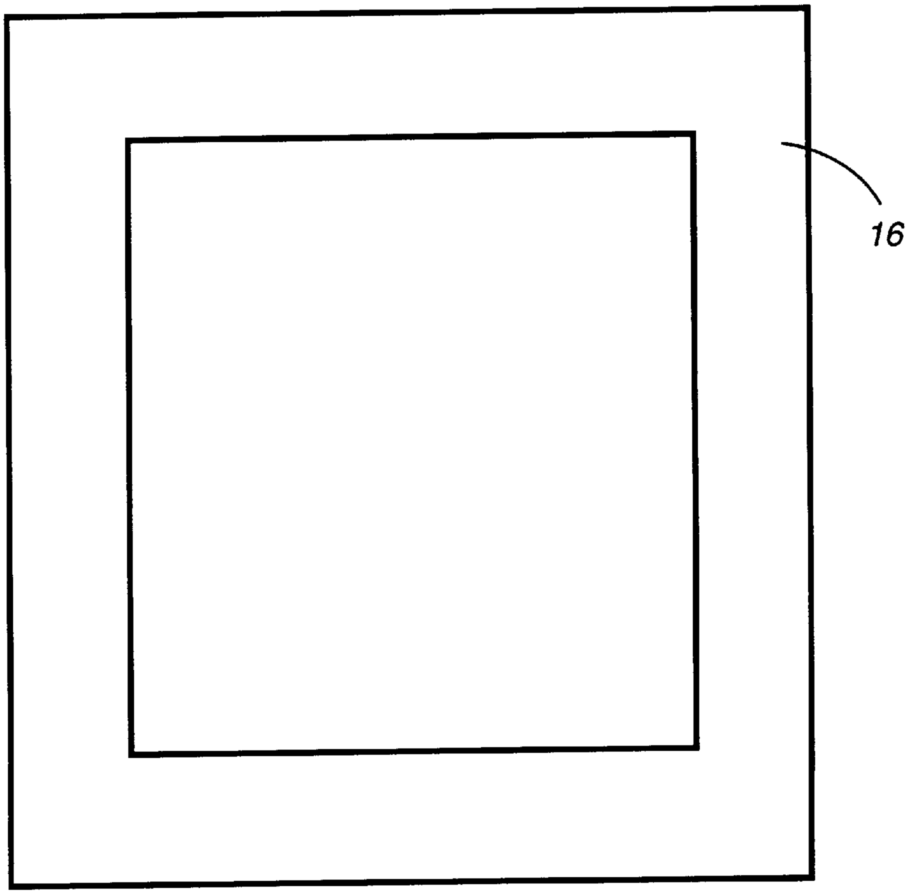
FIG. 5 is a top view of the liner shown in FIG. 3.

The web tension is preferably set at 75 Newtons. A 100 Newton web tension may provide more latitude in printing. After the printing process has been competed, the top and bottom face stock are peeled from each other providing two sheets with printing on a single side of each. The adhesive stays on the liner 36. When printing in accordance with this process sheets can be printed in speeds such as seventy A4 sheets per minute. A top view of the liner 36 is shown in FIG. 5.

Figure 6:
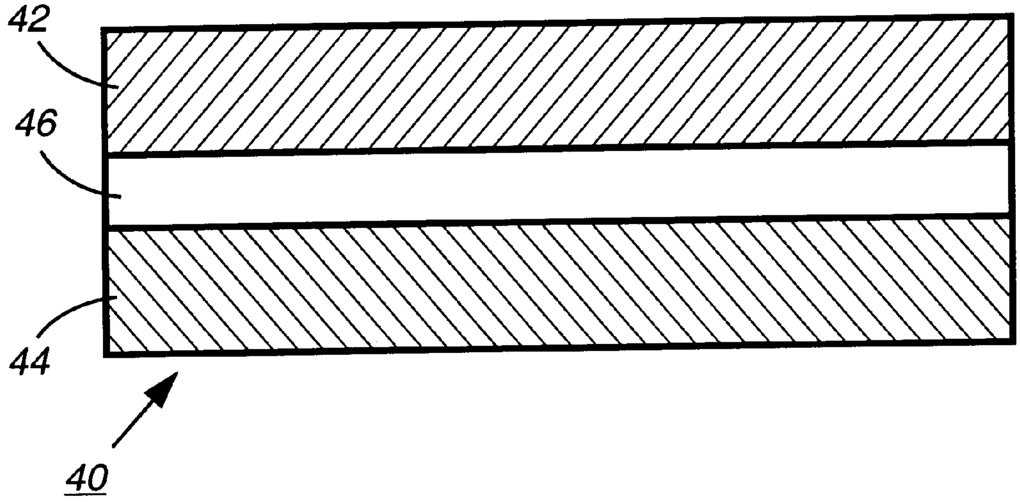
FIG. 6 shows is a cross-section of a print medium constructed in accordance with another embodiment of the invention.

Referring to FIG. 6, there is shown a cross section of a printer medium 40 constructed in accordance with another embodiment of the invention. In this case, the pressure sensitive adhesive is applied to the entire surface of a liner 46 for boding a first layer 42 with a second layer 44.

The top and bottom face stock sheets are bonded on the respective sides of the liner 46. This method improves bonding and eliminates possible air bubbles trapped between the layers (42 and 44). The resulting composite medium (paper) is fed into a printer for printing on each side thereof, and separated (e.g., by a crack and peel process), thus providing two sheets with print on a single side of each. The printing rate is increased by taking advantage of the printer's duplex capability.

Figure 7:
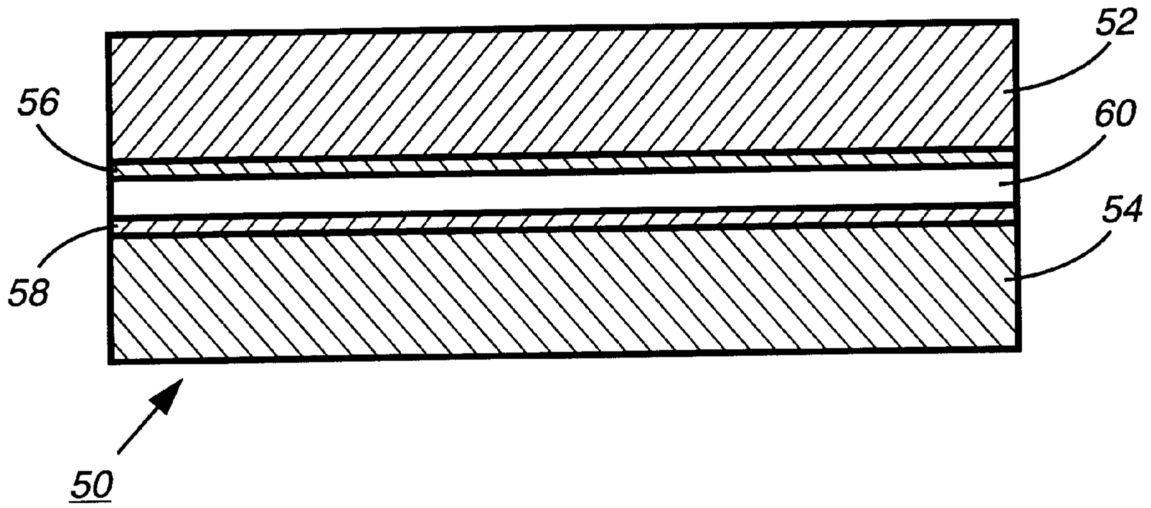
FIG. 7 is a cross-section of a print medium constructed in accordance with yet another embodiment of the invention.

Referring to FIG. 7, there is shown a cross section of a printer medium 50 constructed in accordance with another embodiment of the invention. In this embodiment a polypropylene layer (38 and 40) is bonded onto the non-printing side of each of layers 52 and 54 with pressure-sensitive adhesive. A Silicone liner 56 is then bonded with a pressure sensitive adhesive to each of the polypropylene layers (top 58 and bottom 60). The rest of the printing process is the same as described above. Thus, the printing and media construction methods of the invention provide improved rates of printing.

What is claimed is:

1. A method for printing comprises the steps of:

feeding a multi-layer compound sheet into a dual-simplex printer;

printing on each side of the multi-layer compound sheet, wherein the compound sheet comprises a top layer and a bottom layer, each layer having a top and a bottom surface, wherein the bottom surface of the top layer is removably attached to the top surface of the bottom layer; and separating the layers of the multi-layer compound sheet to produce at least two sheets each having printed material on one side.

2. The method of claim 1 wherein the method comprises:

creating the multi-layer compound sheet by bonding the edges of a stock first layer and a second stock second layer to opposite surfaces of a liner, said liner comprising pressure-sensitive adhesive applied thereon, before the feeding step of claim 1.

3. The method of claim 1 wherein the separating step comprises a crack and peel process.

4. The method of claim 1 wherein the printing step comprises using an infocolor to digital color printer.

5. The method of claim 1 wherein the method comprises:

creating the multi-layer compound sheet by bonding the first stock layer to the second stock layer by bonding each of the first and second stock layers to opposite surfaces of a liner having a pressure sensitive adhesive on each of its surfaces.

6. The method of claim 1 wherein the method comprises:

creating the multi-layer compound sheet by bonding a thin polypropylene layer to each of the non-printing sides of the first and second stock layers; and bonding a Silicone liner with a pressure sensitive adhesive to each of the polypropylene layers.

7. A method for constructing printer media for use in a single-pass dual simplex printing process, comprising the steps of:

applying a pressure sensitive adhesive on at least part of each of the surfaces of a liner sheet; and bonding a first stock layer to a second stock layer by bonding a surface of each of the first and second stock layers to opposite surfaces of the liner.

8. The method of claim 7 wherein the applying step comprises applying pressure sensitive adhesive on each of the entire surfaces of the liner.

9. The method of claim 7 further comprising the steps of:

bonding a thin propylene layer to the non-printing side of each of the first and second stock layers; and bonding a silicone liner having pressure sensitive adhesive on both sides thereof to each of the propylene layers.

10. The method of claim 7 further comprising the step of selecting a thickness of 10 mils or less for the printer media.

11. A multi-layer sheet, for use as a print medium, comprising:

a first stock layer having top and bottom surfaces;

a second stock layer having top and bottom surfaces and having dimensions substantially the same as the first stock layer; and a liner, having pressure sensitive adhesive thereon, disposed between the first and second stock layers for bonding the bottom surface of the first stock layer to the top surface of the second stock layer first and second stock layers to each other, such that the first stock layer can be pealed away from the second stock layer after printing thereon.

12. The multi-layer sheet of claim 11 further comprising first and second propylene layers the first propylene layer being bonded to the bottom surface of the first stock layer and the second propylene layer being bonded to the top surface of the second stock layer.

13. The multi-layer sheet of claim 11 wherein the liner has pressure sensitive adhesive on the edges of each surface thereof.

* * * * *